United States Patent [19]

Hirata et al.

[11] Patent Number: 4,633,158

[45] Date of Patent: Dec. 30, 1986

[54] CONTROL SYSTEM FOR AN AC MOTOR

[75] Inventors: Akio Hirata, Fuchu; Yosio Naito, Tama, both of Japan

[73] Assignee: Kabushiki Kaisha Toshiba, Kawasaki, Japan

[21] Appl. No.: 667,468

[22] Filed: Nov. 1, 1984

[30] Foreign Application Priority Data

Nov. 5, 1983 [JP] Japan ................................. 58-206878
May 4, 1984 [JP] Japan ................................... 59-88358

[51] Int. Cl.⁴ .............................................. H02P 5/40
[52] U.S. Cl. ..................................... 318/723; 318/809
[58] Field of Search ................................ 318/721–723, 318/803, 807–811

[56] References Cited

U.S. PATENT DOCUMENTS 3,894,277 7/1975 Tachibana et al. ................. 318/721
4,264,853 4/1981 Morishita ............................ 318/723
4,276,504 6/1981 Nagase et al. ....................... 318/723

Primary Examiner—David Smith, Jr.
Attorney, Agent, or Firm—Oblon, Fisher, Spivak, McClelland, & Maier

[57] ABSTRACT

A control system for an AC motor to be driven by an inverter, wherein a control lead angle $\beta$ of the AC motor drive current is controlled based on the detection of an actual overlapped angle, a set overlapped angle, a detected motor speed, a detected magnitude of the acceleration-deceleration rate of motor speed, a detected amount of current from a power source and/or a detected magnitude of the change rate in the current from the power source.

3 Claims, 14 Drawing Figures

CONTROL SYSTEM FOR AN AC MOTOR

BACKGROUND OF THE INVENTION

1. Field of the Invention

This invention relates generally to a control system for an AC motor and more particularly to an AC motor control system having an inverter that supplies AC power to the AC motor.

2. Description of the Prior Art

FIG. 1 shows one example of the conventional control system of an AC motor. In FIG. 1, reference numeral 10 designates a three-phase AC source, 11 a breaker, 12 a converter which includes thyristors, 13 a smoothing direct current (DC) reactor, 14 a 120°-conduction inverter which includes thyristors, 15 an AC motor which is the load of the inverter 14, 151 a field winding of the AC motor, 152 a field converter that supplies power to the field winding 151, 16 a speed setter, 24 a speed detector that detects the speed of the AC motor, 17 a speed controller, 18 a current controller, 19 a phase controller that controls an output voltage of the converter 12, 20 a current detector, 23 an overlapped angle detector that detects an overlapped angle $\mu$ of the inverter 14, 22 a voltage detector, and 21 a control lead angle $\beta$ controller, respectively.

As can be seen from FIG. 1, AC power from the three-phase AC power source 10 is converted into a variable DC voltage by means of the converter 12, is smoothed by the DC reactor 13, thereafter is reversely converted into an AC power by the inverter 14, and then is supplied to the AC motor 15. The converter 12 and the inverter 14 are controlled such that a speed reference signal set by the speed setter 16 and a speed signal corresponding to the speed of the AC motor 15, as detected by the speed detector 24, are fed into the speed controller 17, and compared and amplified therein so as to produce thereby a current reference signal. The thus produced current reference signal and a current signal detected by the current detector 20 are compared and amplified within the current controller 18. Then the result of this comparison is fed into the phase controller 19 so as to control an output voltage of the converter 12.

On the other hand, the overlapped angle detector 23 detects an overlapped angle $\mu$ of the inverter 14 on the basis of currents, voltages and frequencies detected by the current detector 20. The thus detected overlapped angle $\mu$ and output voltage of the inverter 14 detected by the voltage detector 22 are fed into the control lead angle $\beta$ controller 21, which in turn, determines firing pulse timing for respective thyristors of the inverter 14 so as to control the output frequency thereof. Here, a control lead angle $\beta$ is based on a $\gamma$ constant control which is given by the sum of a constant commutation marginal angle $\gamma$ determined by the thyristors employed in the inverter 14 and an overlapped angle $\mu$ that increases in relation to an increase in current of the AC motor 15. More particularly, $\gamma = \omega T_c$, where $\omega$ equals the angular frequency and $T_c$ equals the time from when the thyristor forward current becomes zero to the time when the inverse voltage becomes zero. The relationship is shown in FIG. 2.

When the above-described control is performed digitally using a microprocessor and the like, an overlapped angle $\mu$, which represents the time expressed in electrical degrees during which current is on simultaneously in two rectifying elements ($\beta = \gamma + \mu$), is calculated with a specified calculation processing interval. However, if motor acceleration or deceleration is rapid or a change rate of current is great, the actual overlapped angle $\mu$ is varied more than the calculated value, whereby a commutation marginal angle becomes insufficient. This results in commutation failure of the inverter, so that a safety operation cannot be secured. This disadvantage can be eliminated by decreasing the time interval for processing of the overlapped angle $\mu$. However, a microprocessor or the like inevitably has limited processing speed. Further, there have been such disadvantages that even if an overlapped angle is accurately processed, in the case when current of the AC motor 15 is rapidly increased, the terminal voltage is also varied causing an actual overlapped angle $\mu$ to be greater than the thus calculated overlapped angle $\mu$, so that the variable speed control of the AC motor 15 becomes unstable.

SUMMARY OF THE INVENTION

Accordingly, one object of this invention is to provide a novel control system for an alternating current motor, which is capable of controlling a control lead angle $\beta$ without commutation failures even during periods of rapid motor acceleration or deceleration, thereby securing safe operation of the motor.

The above-noted object, as well as other objects, is achieved by providing a novel control system for an AC motor, wherein a power source supplies AC current to a converter which converts the AC current into a DC current. The DC current is smoothed and by means of an inverter is converted back to an AC signal at a controlled lead angle $\beta$, which drives the AC motor. The lead angle $\beta$ is controlled based on the detection of an actual overlapped angle, a set overlapped angle, a detected motor speed, a detected rate of acceleration or deceleration of motor speed, a detected amount of current from the power source, or the rate of change of this current, or selected combinations of the named parameters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
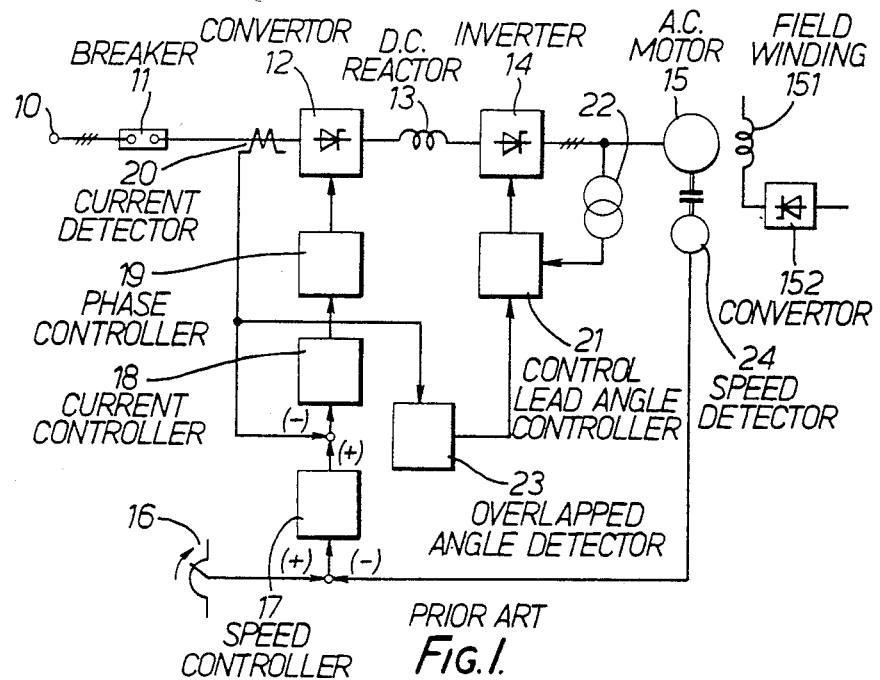
FIG. 1 is a block diagram illustrating the conventional control system for AC motors.
Figure 2:
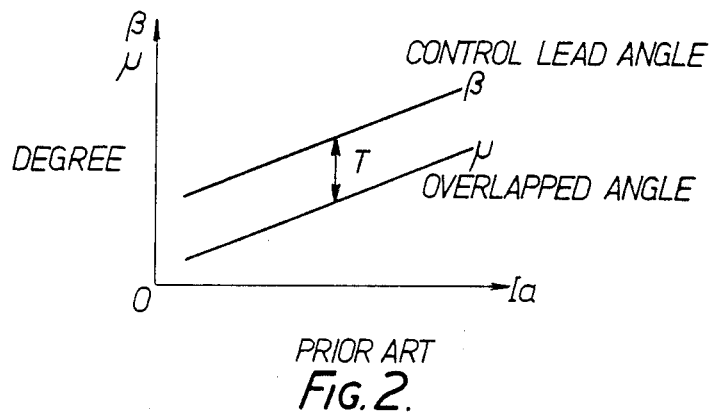
FIG. 2 is a diagram illustrating the relationship between a current, a control lead angle $\beta$ and an overlapped angle $\mu$.

Referring now to the drawings, wherein like reference numerals designate identical or corresponding parts throughout the several views, various embodiments of the present invention will be described.

Figure 3:
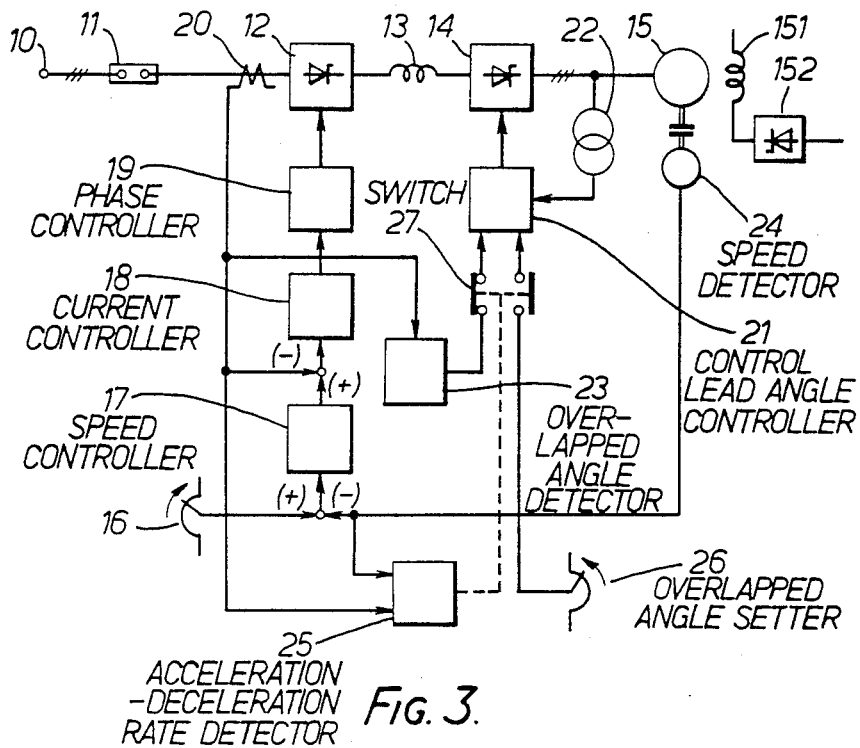
FIG. 3 is a diagram illustrating one embodiment of a control system for AC motors according to the invention.

FIG. 3 is a block diagram illustrating one embodiment of the invention. For the sake of brevity, the description of the structure identical or equivalent to that shown in FIG. 1, as evidenced by like reference numerals, is omitted. In FIG. 3, reference numeral 25 designates an acceleration-deceleration rate detector, 26 an overlapped angle setter, and 27 a switch, respectively. When an acceleration-deceleration rate exceeds the speed detected by the speed detector 24 by more than a specified value, the acceleration-deceleration rate detector 25 operates the switch 27 to feed a specified overlapped angle $\mu$ set by the overlapped angle setter 26 into the control lead angle $\beta$. When the acceleration-deceleration rate decreases and the current detected by current detector 20 also decreases, a signal corresponding to the detected current is fed into one input of the acceleration-deceleration rate detector 25, which causes the switch 27 to be reset. Then a control lead angle $\beta$ is controlled by use of an overlapped angle $\mu$ obtained by the overlapped angle detector 23.

Figure 4:
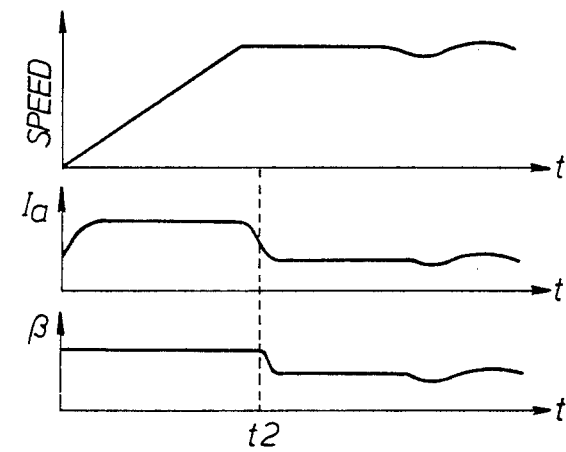
FIGS. 4, 6, 10 and 12 are diagrams illustrating the relationships between a speed, a current and a control lead angle $\beta$ of respective embodiments of the invention.

FIG. 4 is a diagram illustrating the relationship between the detected current and control lead angle $\beta$. As can be understood from FIG. 4, during the period from 0 to a time t2, a specified overlapped angle $\mu$ set by the overlapped angle setter 26 is given, so that even when acceleration or deceleration is rapidly made, the necessary commutation marginal angle $\gamma$ can be obtained, whereby a steady operation can be performed without any commutation failure.

Figure 5:
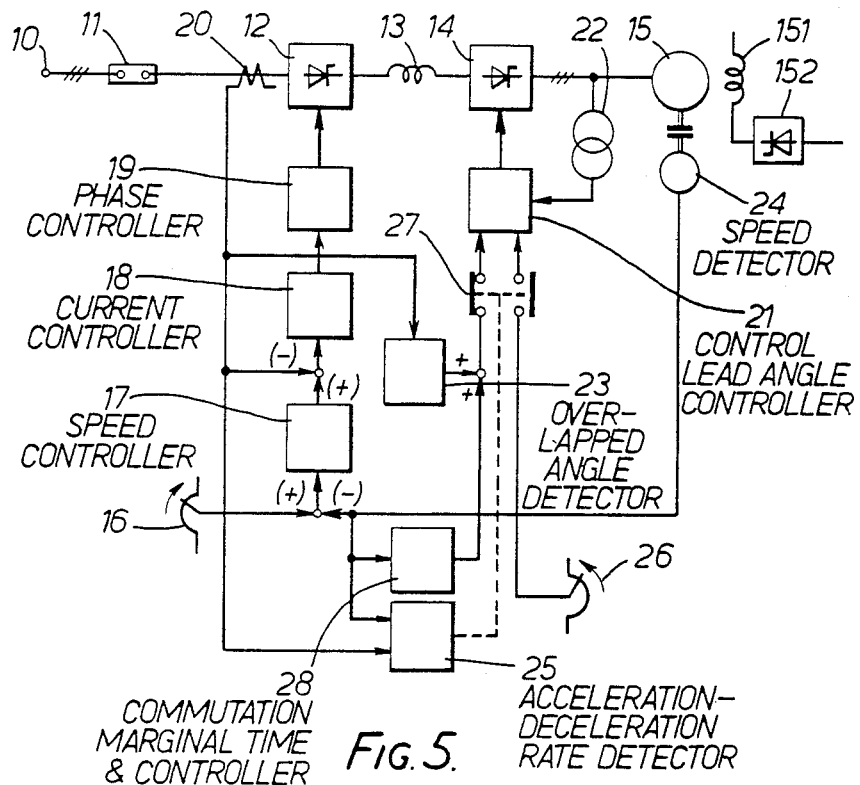
FIGS. 5, 7-9, 11, 13 and 14 are block diagrams illustrating other embodiments of control systems for AC motors according to the invention.
Figure 7:
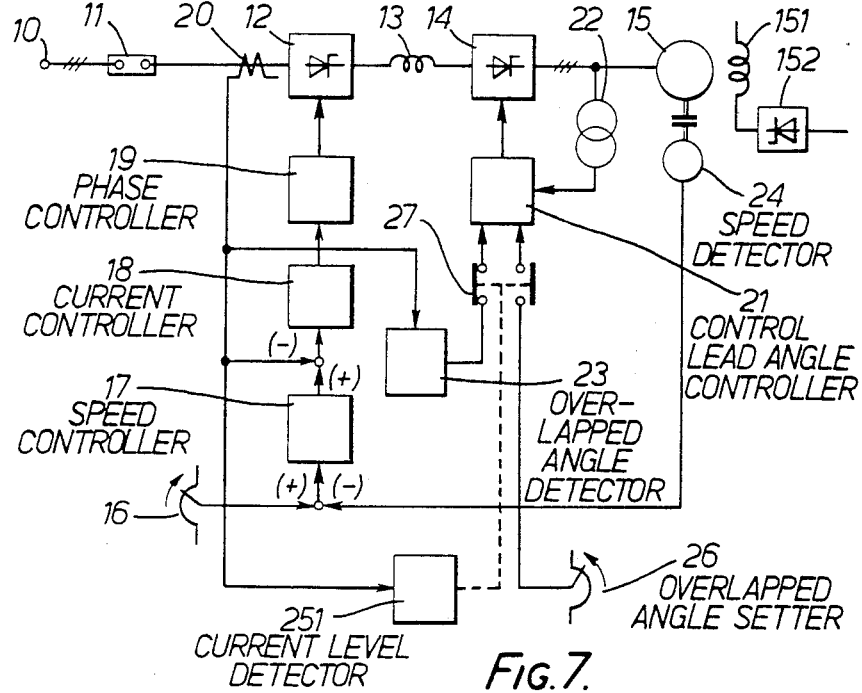
Figure 8:
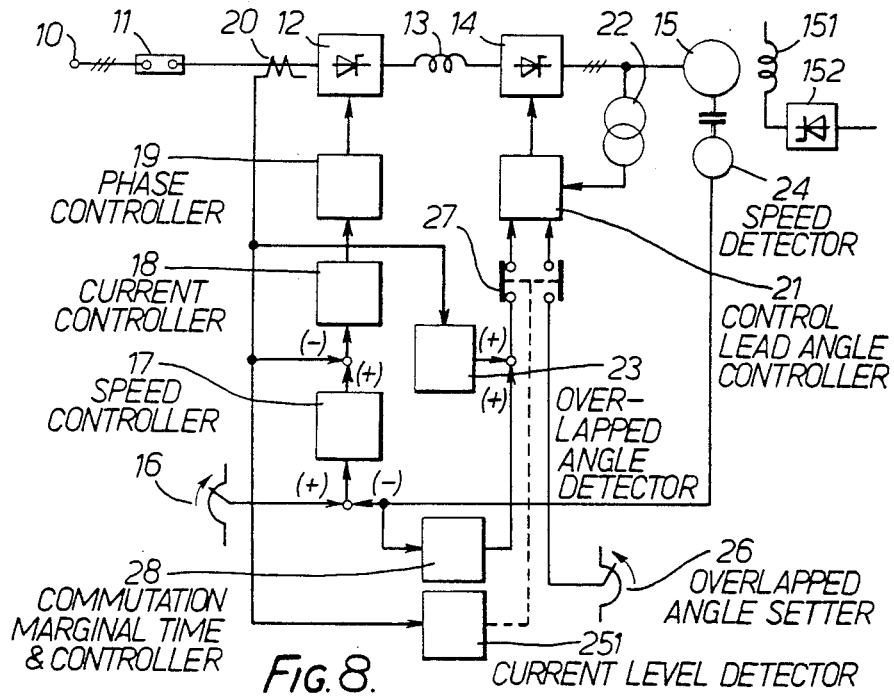

FIGS. 5, 7 and 8 are block diagrams illustrating other embodiments of the invention. Here reference numerals identical with those of FIG. 1 or FIG. 3 designate identical parts or equivalent thereto, and thus explanations thereof are again omitted.

In FIG. 5, reference numeral 28 designates a commutation marginal time controller that controls a commutation marginal time $\gamma$. A signal indicative of the speed detected by the speed detector 24 is fed into the commutation marginal time controller 28 so as to be converted into an angle, which in turn, is summed with an overlapped angle $\mu$ detected by the overlapped angle detector 23 and fed into the control lead angle $\beta$ controller 21. When acceleration or deceleration is rapidly made, if the acceleration-deceleration rate detector 25 detects that an acceleration-deceleration rate of speed has exceeded a specified value, the switch 27 is operated to feed a specified overlapped angle $\mu$ set by the overlapped angle setter 26 into the control lead angle $\beta$ controller 21 so as to control a control lead angle $\beta$.

Figure 6:
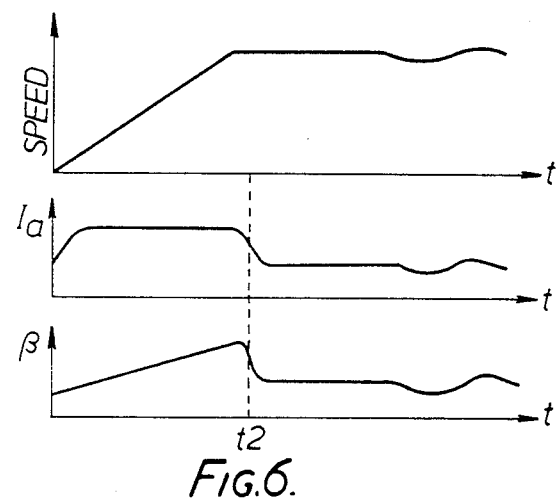

FIG. 6 is a diagram illustrating the relationship between speed, current and control lead angle $\beta$ in the embodiment shown in FIG. 5. As can be understood from the relationship diagram, during the period from 0 to a time t2, the acceleration-deceleration rate exceeds a specified acceleration-deceleration rate, so that a specified overlapped angle is given and thereafter, a control lead angle $\beta$ is controlled on the basis of an overlapped angle obtained by the overlapped angle detector 23.

Therefore, steady operation of the A.C. motor can be secured without any commutation failure because a specified overlapped angle is given to control the control lead angle $\beta$ such that a constant commutation marginal time $\gamma$ is invariably obtained even when acceleration or deceleration is rapidly made.

In the two embodiments of the invention described above, the acceleration-deceleration rate of speed is detected by use of a speed, however, a speed reference signal can also be used instead of such a speed to obtain similar advantages.

In FIG. 7 and FIG. 8, reference numeral 251 designates a current level detector that receives a signal indicative of current, and when the current exceeds a specified value, operates the switch 27 to feed a specified overlapped angle $\mu$ set by the overlapped angle setter 26 into the control lead angle $\beta$ controller 21. When acceleration or deceleration is rapidly made, if the detected speed exceeds a specified acceleration-deceleration rate, and the current also exceeds a specified level, this causes the switch 27 to be switched so as to feed a specified overlapped angle to the control lead angle $\beta$ controller 21, whereby similar advantages can be obtained. When the current level detector 251 functions to detect a current change rate in addition to comparing the current level, this enables the switch 27 to be switched to feed a specified overlapped angle to the control lead angle $\beta$ controller 21, so as to control the control lead angle $\beta$ even when an abrupt current change occurs, whereby a steady operation can also be obtained without any commutation failure.

Figure 9:
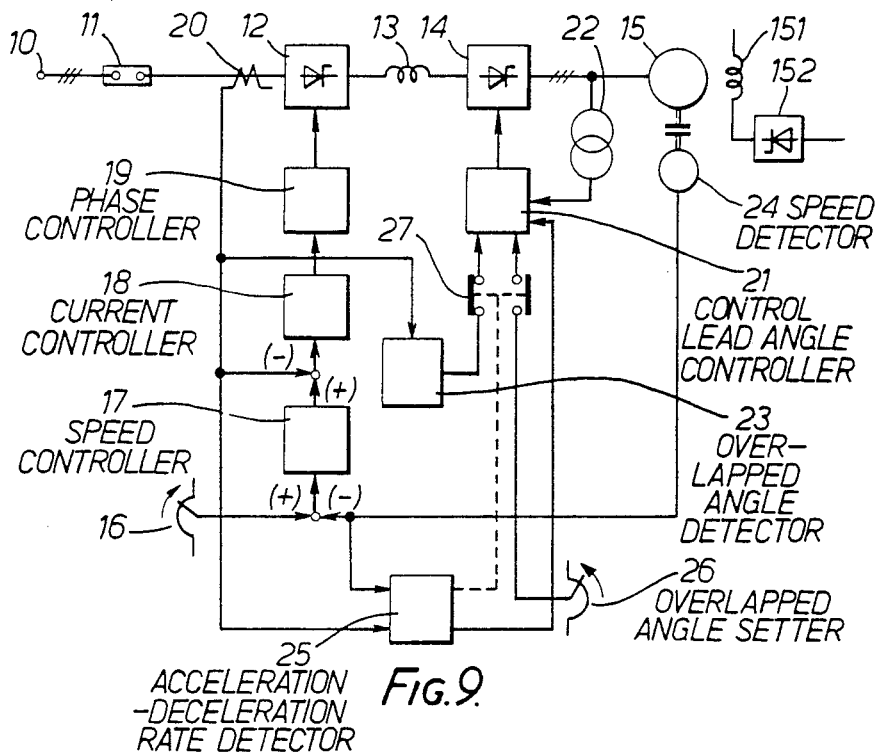

Referring now to FIG. 9, reference numeral 25 designates an acceleration-deceleration rate detector, 26 an overlapped angle setter, and 27 a switch, respectively. When the detected acceleration-deceleration rate exceeds the speed detected by the speed detector 24 by a specified value, the acceleration-deceleration rate detector 25 causes the switch 27 to be switched to feed a specified overlapped angle $\mu$ set by the overlapped angle setter 26 into the control lead angle $\beta$ controller 21. The control lead angle $\beta$ controller 21 also directly receives an output signal of the acceleration-deceleration rate detector 25.

When the acceleration-deceleration rate detected by the acceleration-deceleration rate detector 25 is below a specified value, the control lead angle $\beta$ controller 21 controls, on the basis of the output signal of the overlapped angle detector 23 and the voltage detecting signal of the voltage detector 22, a control lead angle $\beta$ in such a manner that commutation marginal time of the inverter 14 is maintained substantially constant independently of the number of revolutions of the AC motor 15. When the acceleration-deceleration rate exceeds a specified value, the control lead angle $\beta$ controller 21 controls, by use of an overlapped angle $\mu$ set by the overlapped angle setter 26, a control lead angle $\beta$ in such a manner that commutation marginal angle $\gamma$ of the inverter 14 is maintained substantially constant. When the acceleration-deceleration rate is decreased as caused by a decrease in the motor current, the acceleration-deceleration rate detector 25 causes the switch 27 to be reset on the basis of a current detecting signal applied by the current detector 20 as an input signal to an other terminal of the acceleration-deceleration rate detector 25. Therefore, after the acceleration-deceleration rate has once exceeded a specified value, the acceleration-deceleration rate detector 25 maintains the above-described state until the current of the AC motor decreases to the specified value.

Figure 10:
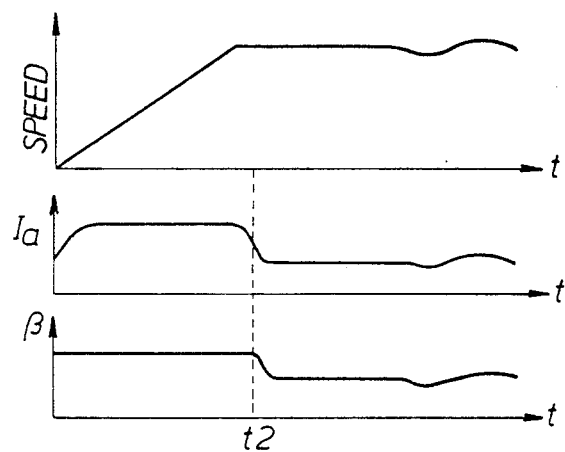

FIG. 10 is a diagram illustrating the relationship between current and control lead angle $\beta$. In FIG. 10, the control lead angle $\beta$ controller 21 receives a specified overlapped angle $\mu$ set by the overlapped angle setter 26 during the period from 0 to a time t2 in order to control a commutation marginal angle $\gamma$ so as to be substantially constant, so that even when acceleration or deceleration is rapidly made, a necessary commutation marginal angle $\gamma$ can be obtained, whereby steady operation of the AC motor can be secured without any commutation failure.

On the other hand, after the time t2, the acceleration-deceleration rate substantially decreases, so that the control lead angle $\beta$ controller 21 controls the control lead angle $\beta$ such that the overlapped angle $\mu$ detected by the overlapped angle detector 23 and the commutation marginal time $\gamma$ are maintained substantially constant, whereby the control lead angle $\beta$ becomes smaller and the operation power factor of the AC motor 15, which is expressed by the following equation, $$\cos\left(\beta - \frac{\mu}{2}\right) \cos\left(\frac{\mu}{2}\right)$$

is enhanced.

Therefore, when the control lead angle $\beta$ is determined as above described, the operation power factor is enhanced whereby the current of the AC motor is decreased and operational efficiency is also enhanced.

Figure 11:
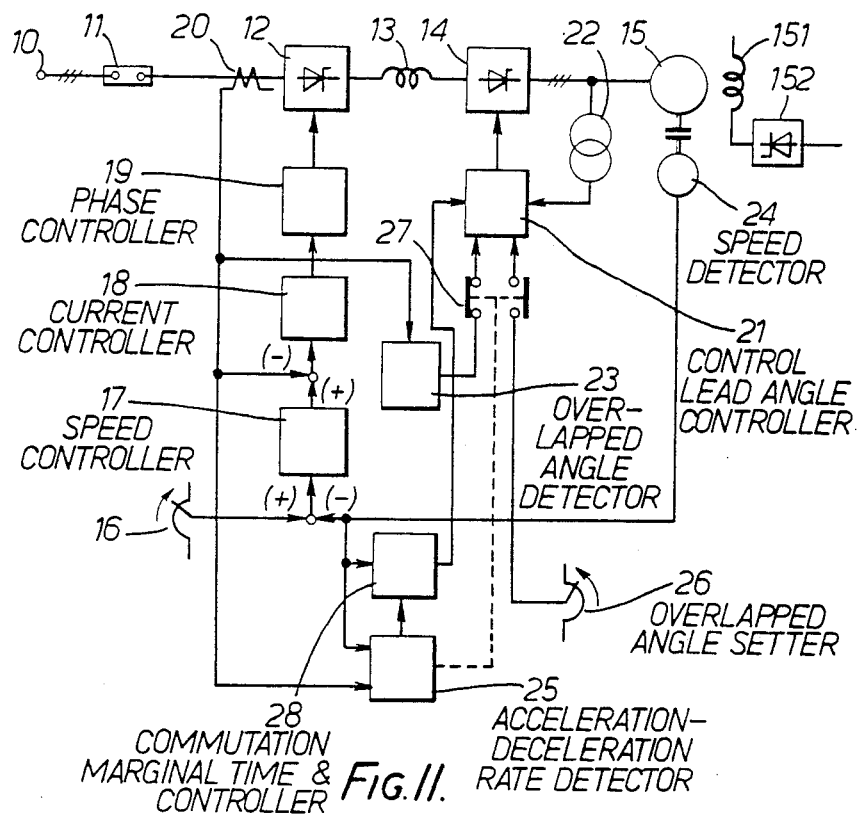

FIGS. 11-14 show other embodiments according to the invention. In FIG. 11, the commutation marginal time controller 28 receives a speed signal and an output from the acceleration-deceleration rate detector 25, converts these signals into an angle, and in turn, feeds a signal corresponding to a commutation marginal angle $\gamma$ to the control lead angle $\beta$ controller 21. Upon rapid acceleration or deceleration, if the acceleration-deceleration rate detector 25 detects that the acceleration-decelertion rate has exceeded a specified value, the switch 27 is caused to feed a specified overlapped angle $\mu$ set by the overlapped angle setter 26 into the control lead angle $\beta$ controller 21 so as to control the control lead angle $\beta$.

In this case, the commutation marginal time controller 28 controls the control lead angle $\beta$ controller 21 such that the commutation marginal angle $\gamma$ is controlled to be substantially constant. On the other hand, when an acceleration-deceleration rate drops below a specified value, if the speed of the AC motor 15 is more than a specified value, the commutation marginal time controller 28 controls the control lead angle $\beta$ such that the commutation marginal time is controlled to be substantially constant.

Figure 12:
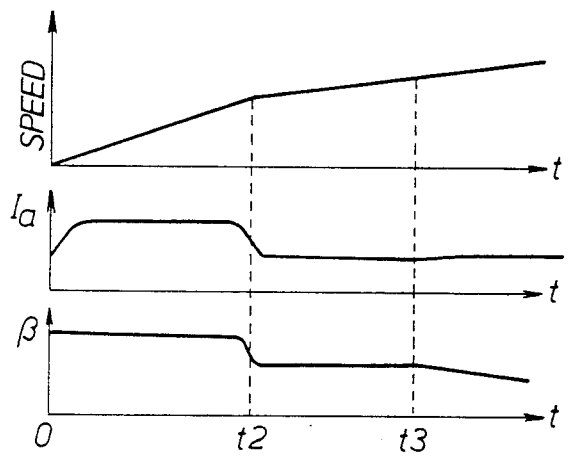

FIG. 12 is a diagram illustrating the relationship between speed, current and the control lead angle $\beta$ in the embodiment shown in FIG. 11. In FIG. 12, during the period from 0 to a time t2, the acceleration-deceleration rate is more than a specified value, so that a specified overlapped angle $\mu$ is fed into the control lead angle $\beta$ controller 21, and after the time t2, an overlapped angle obtained from the overlapped angle detector 23 is fed to the control lead angle $\beta$ controller 21 so as to control a control lead angle $\beta$.

Further, a commutation marginal time is controlled such that a commutation marginal angle $\gamma$ is maintained constant until a time t3. However, after the time t3, even when a current Ia remains constant, the commutation marginal time is controlled so as to be substantially constant. Thus the control lead angle $\beta$ becomes smaller compared to that existing in the period between the times t2 and t3.

Moreover, according to the present invention, control of the AC motor 15 may be carried out only when the acceleration-deceleration rate detector 25 detects a specified acceleration rate or only when a specified deceleration rate is detected by the same. Namely, similar advantages can be obtained even when the control of the AC motor 15 is carried out separately in terms of when acceleration or deceleration is made.

In the aforementioned embodiment, the acceleration-deceleration rate of speed is detected by use of a speed signal. However, a specified speed reference signal may also be used instead to achieve similar advantages.

Figure 13:
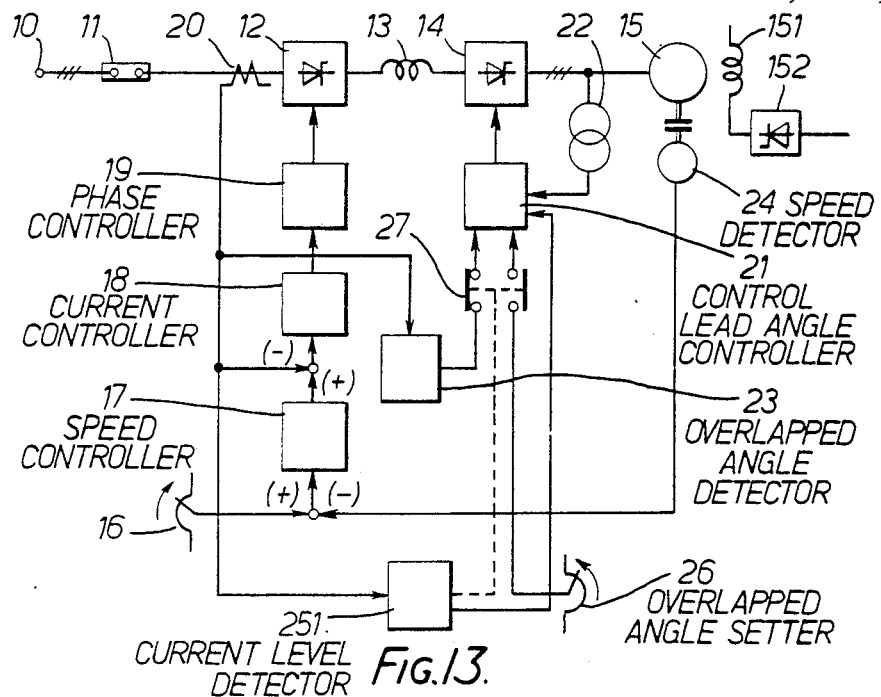
Figure 14:
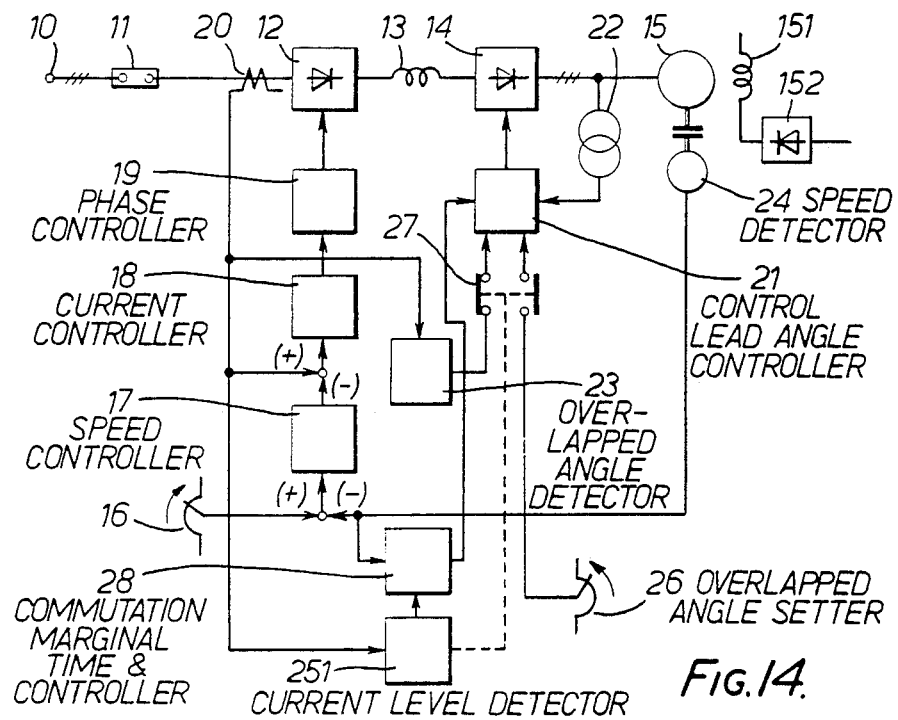

FIG. 13 and FIG. 14 show block diagrams illustrating other embodiments according to the invention. Reference numeral 251 designates the current level detector, which detects when the current exceeds a specified value, and then causes the switch 27 to be switched so as to feed a specified overlapped angle $\mu$ set by the overlapped angle setter 26 into the control lead angle $\beta$ controller 21. When acceleration or deceleration is rapidly made, if the detected speed exceeds a specified acceleration-deceleration rate, the detected current also exceeds a specified level. The fact that the current has exceeded the specified level causes the switch 27 to be switched so as to feed a specified overlapped angle $\mu$ into the control lead angle $\beta$ controller 21, so that similar advantages can be obtained. In addition to performing a current comparison function, the current level detector 251 detects the current change rate. Therefore, even when a rapid current change occurs, the current level detector 251 can cause the switch to be switched so as to feed a specified overlapped angle $\mu$ into the control lead angle $\beta$ controller 21, whereby the control lead angle $\beta$ is controlled. This achieves steady operation of the AC motor 15 without any commutation failure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A control system for controlling the operation of an AC motor, comprising:
   converter means for converting an AC current from a power source into a DC current;
   phase control means for controlling said converter means;
   reactor means for smoothing a DC current output from said converter means;
   inverter means for converting the smoothed DC current output into an AC current output, said inverter means adapted to drive said AC motor by means of said AC current output;
   means for detecting an overlapped angle of said AC current signal supplied to said converter means;
   rate detector means for at least detecting the acceleration-deceleration rate of said AC motor;
   overlapped angle setter means for setting an overlapped angle of said inverter means to a specified value; and
   means for controlling a control lead angle of said inverter means in accordance with the overlapped angle set by said overlapped angle setter means when an acceleration-deceleration rate of said AC motor detected by said rate detector means exceeds a specified value and for controlling the control lead angle to be substantially constant when said acceleration-deceleration rate drops below said specified value.

2. A control system for controlling the operation of an AC motor, comprising:

converter means for converting an AC current from a power source into a DC current;

phase control means for controlling said converter means;

reactor means for smoothing a DC current output from said converter means;

inverter means for converting the smoothed DC current output into an AC current output, said inverter means adapted to drive said AC motor by means of said AC output current;

rate detector means for detecting at least an acceleration-deceleration rate of said AC motor;

means for controlling a commutation marginal angle $\gamma$ to be substantially constant within a specified operation range of said AC motor at least when the detected acceleration-deceleration rate exceeds a specified value and for controlling a commutation marginal time to be substantially constant when said acceleration-deceleration rate drops below said specified value.

3. A control system according to claim 1, wherein the acceleration-deceleration rate detector detects said acceleration-deceleration rate based on a detected value of at least one of said AC current from said power source, a change rate of said AC current from said power source, motor speed, a motor speed command change rate and a combination of selected of said values.

* * * * *